United States Patent [19]

Hoffman et al.

[11] Patent Number: 4,740,658
[45] Date of Patent: Apr. 26, 1988

[54] PUSHING AND PULLING CABLE

[75] Inventors: Ernest G. Hoffman, Middlefield; David H. Neuroth, Hamden, both of Conn.

[73] Assignee: Hubbell Incorporated, Orange, Conn.

[21] Appl. No.: 937,009

[22] Filed: Dec. 2, 1986

[51] Int. Cl.[4] .............................................. H01B 7/18
[52] U.S. Cl. ................... 174/103; 174/102 R; 174/106 R; 174/108; 174/109; 174/111; 174/117 F
[58] Field of Search ............... 174/102 R, 103, 106 R, 174/108, 109, 117 F, 111; 166/77, 385; 57/206; 226/172, 74, 52

[56] References Cited

U.S. PATENT DOCUMENTS

| | | | |
|---|---|---|---|
| 2,975,807 | 3/1961 | Waninger | 174/111 |
| 3,265,269 | 8/1966 | Godderidge | 226/172 |
| 3,285,485 | 11/1966 | Slator | 226/172 |
| 4,027,514 | 6/1977 | Moreau | 226/172 |
| 4,374,530 | 2/1983 | Walling | 138/110 |
| 4,644,094 | 2/1987 | Hoffman | 174/103 |

*Primary Examiner*—Morris H. Nimmo
*Attorney, Agent, or Firm*—Jerry M. Presson; Mark S. Bicks

[57] ABSTRACT

An elongated cable structure of rigid and flat transverse cross-section for protecting conduits of various types includes interior axial lines of high tensile strength which may be used to suspend equipment from one cable end and to force the equipment axially past obstructions in a well hole. The structure may be raised and lowered in the well hole by means of exterior teeth which are firmly secured to the underlying tensile lines project from the surface of the structure to mesh with traction drives.

23 Claims, 3 Drawing Sheets

PUSHING AND PULLING CABLE

Field of the Invention

The invention relates to a reinforced cable structure of flat cross-sectional shape and is especially constructed for deploying, suspending, operating and retrieving submersible pumps in oil wells. The exterior surface of at least one side of the structure is provided with a series of longitudinally spaced teeth that project from this surface to mesh with, for example, the cleats of a coil tubing injector, and thereby achieve a positive drive engagement therebetween.

BACKGROUND OF THE INVENTION

Cable structures for hauling electrical power, hydraulic and electrical signal transmission lines are typically used in oil wells for the installation, operation and retrieval of electrical pumps and other apparatus attached to the down-hole end of the structure.

Prior art cable structures used for this purpose are generally flat and comprise a core of power and hauling lines surrounded by a helically-wound, interlocked armor tape. An example of a prior art cable of this type is disclosed in copending U.S. Pat. No. 4,644,094, of Ernest G Hoffman, issued Feb. 17, 1987 and in U.S. Pat. No. 4,716,260 of Ernest G. Hoffman and David H. Neuroth, issued Dec. 29,1987 both of said applications being assigned to the same assignee as the instant application.

To chemically treat bottom hole oil wells, a hollow flexible conduit, which typically takes the form of a corrugated steel tubing, is inserted into the well. This tubing serves as the medium through which an appropriate treatment fluid, such as liquid nitrogen, is able to be injected into the well. A pair of coacting vertical endless traction belts mounting laterally spaced apart cleats is typically used for driving the tubing into and pulling the tubing out of the particular bore hole. This type of meshing drive means is often referred to as an "injector" and normally has its belts oriented in vertical alignment with the surface entrance to the bore hole. The tubing is gripped tightly between the coacting cleats which translate in the vertical plane upon rotation of the traction belts or chains to impart vertical movement to the tubing. A powered reel is typically used to store, pay out and accumulate the tubing.

An injector of this type is disclosed, for example, in U.S. Pat. No. 3,285,485 which issued to Damon T. Slator on Nov. 15, 1966.

Inasmuch as a source of pushing and pulling forces is available with injectors, it would be advantageous to have a cable which could also effectively utilize these commercially-available meshing drives as a means for positively driving the cable structure and any equipment attached to the cable's down-hole end past obstructions and deviations in the bore hole.

To be able to utilize the available mesh drives effectively, the cable structure preferably should posses the feature of being able to efficiently convert the available drive forces into high magnitude axial pushing and pulling forces which can be concentrated along the longitudinal axis of the cable structure and hence, parallel to the desired direction of cable translation.

As disclosed in our aforementioned copending patent applications, an armored cable structure which is formed by overlapping and interlocked convolutions of armor windings may be compressively driven to move the cable structure in an oil well. The armor is coupled to the hauling lines through a vertebrae-like structure which efficiently transmits the longitudinal and normal components of frictional forces applied to the outer surface of the armor through the cable structure to the hauling lines.

In these cable structures the axial components of the driving forces will be substantially equal to the coefficient of friction between the surface of the armor and the drive means contacting that surface multiplied by the magnitude of the force components normal to that surface. For certain field applications, particularly deep well applications, which require that considerable lengths, and correspondingly considerable weights of cable be raised and lowered or for other field applications where considerable pushing and pulling forces are required to force the cable and its attached equipment axially past obstructions in the bore hole, it may be necessary to utilize positive meshing drives as an alternative to frictional engagement or as a supplement to frictional engagement.

Although meshing drives have been used by others in the past to drive cable structures axially in bore holes, the cable structure, in my opinion, has not been constructed to utilize this type of engagement in an optimum fashion. For example, in U.S. Pat. No. 4,374,530 to John B. Walling, there is disclosed a cable structure which is reinforced by a succession of spaced-apart striker plates. The plates are designed to be engaged by the teeth of a drive sprocket which provide a mesh drive with the cable structure. Specifically, each striker plate has a transversely grooved face for meshing with the teeth of the drive sprocket and the plates are separated along the length of the structure by intervening lengths of flexible polymeric production tubing employed to provide bendability to the structure. With this arrangement, the plates are positively and successively engaged by rotation of the drive sprocket teeth to move the cable structure longitudinally.

One disadvantage of the Walling cable structure is that the striker plates are designed simply to receive but not to grip the longitudinal tensile elements which are used to suspend the cable structure. Hence, when long lengths of cable are suspended, the weight of the suspended length of the cable hanging below the engaged striker plate may cause the tensile elements to slide through the bores in which they are received in the engaged striker plate causing undesirable separations to occur between various parts of the suspended structure. In addition, the flexible nature of the ploymeric production tubing may allow it to elongate axially during usage. Since the striker plates in Walling are maintained in their axially spaced relationship by the abutting and underlying tubing, it is apparent that the axial distance or pitch between the grooves in successive striker plates could vary, especially as the cable is withdrawn under tension from the bore hole. At this time, elongation of the intervening polymeric tubing sections can be most appreciable, as will be obvious. If the pitch of adjacent striker plates increases as a result, the sprocket teeth which remain of fixed pitch may not mesh precisely with the metal grooves in the striker plates, thus allowing slippage to occur between the sprocket teeth and the cable structure or, in severe situations, possibly allowing the sprocket teeth to engage and pinch the intervening sections of polymeric tubing and the conduits contained therein.

SUMMARY OF THE INVENTION

An object of this invention is to provide a cable structure having an exterior surface designed and constructed to mesh with a conventional mesh-type of cable drive means.

Another object of this invention is to provide a cable structure with teeth of virtually constant pitch which can be positively engaged and driven by commercially available mesh-type drive means.

The instant invention provides a cable structure which overcomes the problems of prior art structures by providing teeth on the exterior surface of the cable structure for meshing with the available cable drive means and by virtually nonextendably coupling the teeth to one another in the axial direction to ensure that a constant pitch is maintained between successive teeth during usage of the cable structure.

More specifically, in accordance with this invention, there is provided an elongated cable structure of flattened cross-sectional shape which utilizes a series of elongated toothed elements extending perpendicular to the longitudinal axis of the structure in longitudinally spaced apart relationship for efficiently converting longitudinal drive force components applied to the toothed elements by meshing traction drives into longitudinal cable pushing and pulling forces.

This conversion is effected by an articulated vertebrae arrangement of transversely rigid blocks on which the toothed elements are mounted. The vertebrae mount the toothed elements upon a pair of symmetrically-disposed tensile lines and the blocks grip line segments to limit any elongation of the gripped segments. The blocks are contiguous to ensure that the pitch between the toothed elements mounted on the blocks is maintained virtually constant even during extreme cable stretching conditions occurring during cable withdrawal from the well.

Other objects, advantages, and salient features of the present invention will become apparent from the following detailed description, which taken in conjunction with the annexed drawings, discloses various embodiments of the present invention.

DRAWINGS

Referring now to the drawings which form a part of this original disclosure:

DETAILED DESCRIPTION OF THE INVENTION

Figure 1:
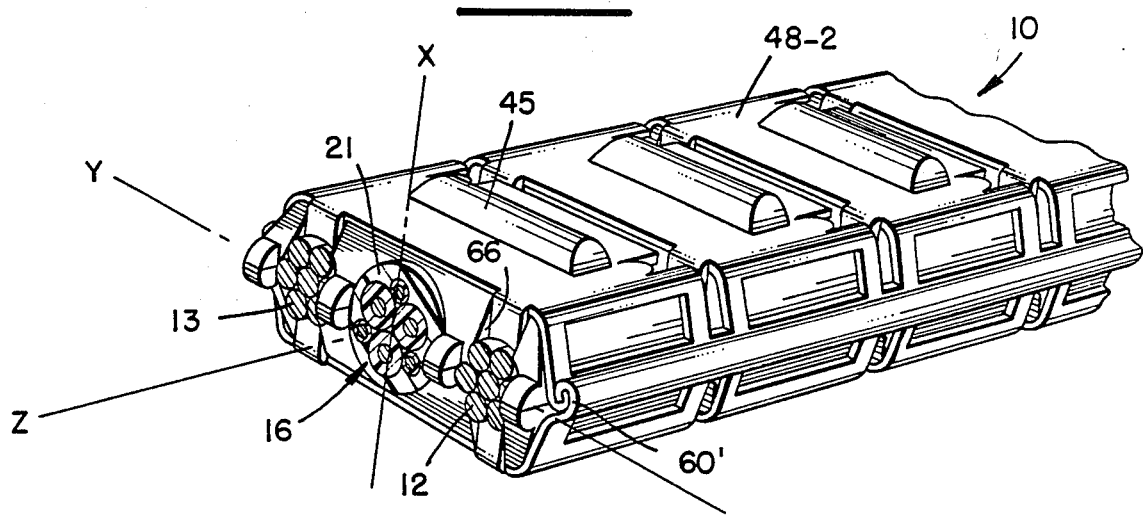
FIG. 1 is a right perspective view of a section of one embodiment of an assembled cable structure constructed in accordance with this invention.
Figure 2:
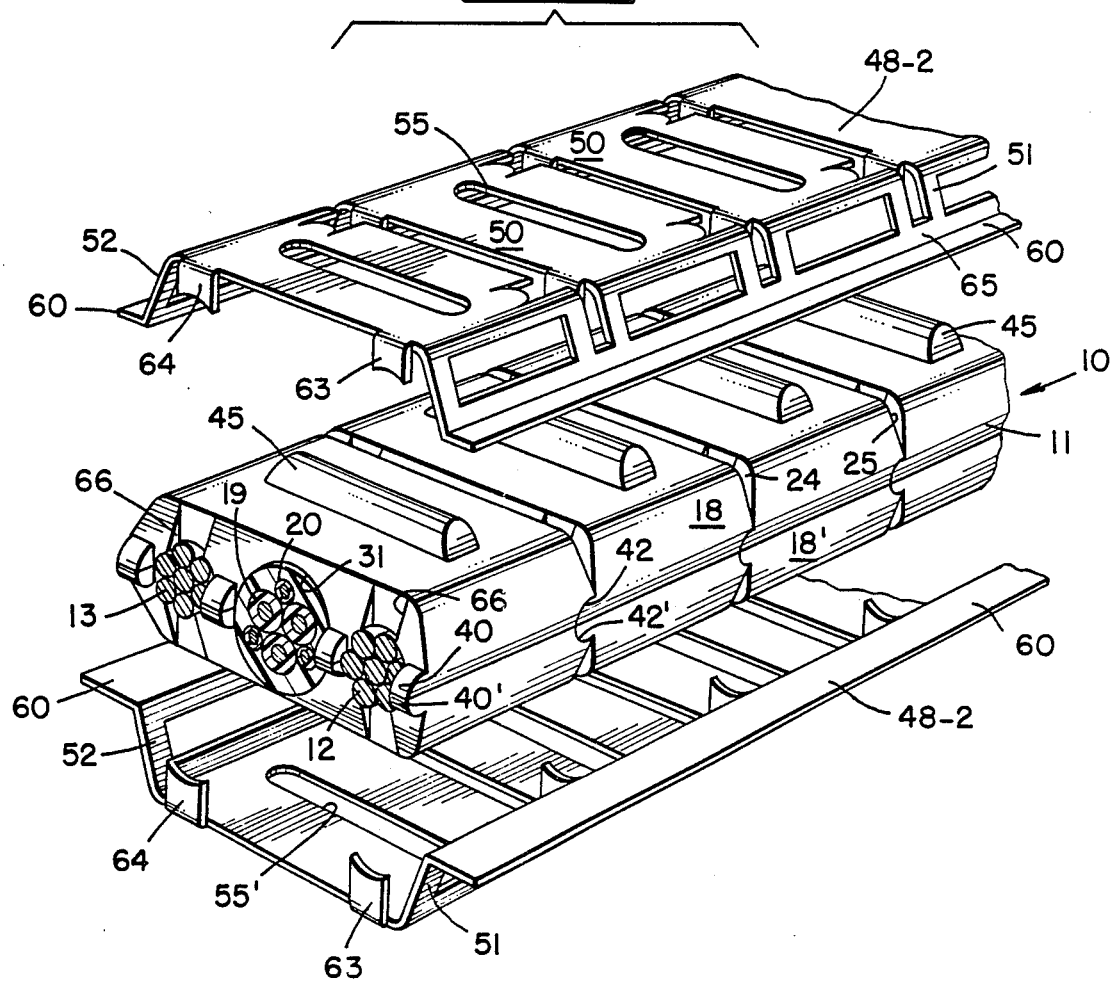
FIG. 2 is an exploded right perspective view of the embodiment of the cable structure illustrated in FIG. 1.

As seen in FIGS. 1 and 2, the cable structure 10, constructed in accordance with the instant invention, is substantially flat in transverse cross section. Along its length the structure 10 is comprised of a vertebrae assembly formed of longitudinally rigidly intercoupled blocks 11. The interlinked blocks form a tubular housing for enclosing the tensile (hauling) and the power lines for the equipment attached to these lines.

First and second high tensile strength lines 12 and 13 typically formed of wire strands of high tensile strength, helically twisted together as a rope and disposed parallel to each other inside the blocks 11, provide the main tensile members of the structure from which the downhole equipment ultimately is attached and thereby suspended. Preferably, each of the lines 12 and 13 has the same tensile strength and diameter and both are disposed symmetrically on each side of the neutral axis Z of the structure 10.

Figure 6:
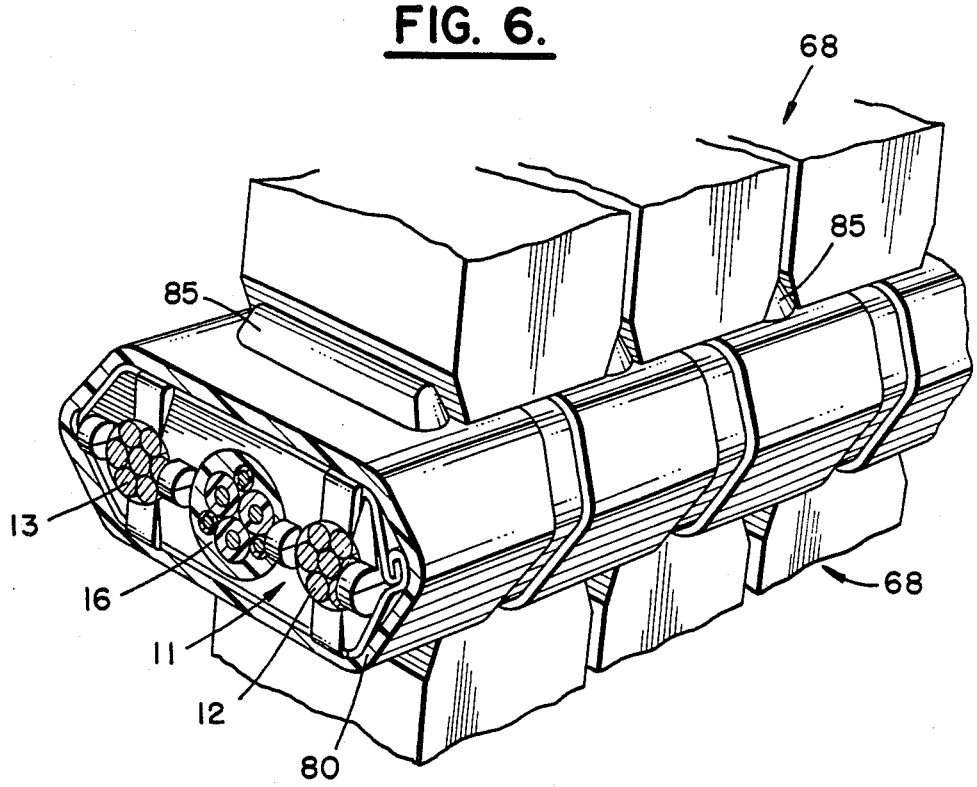
FIG. 6 is a perspective view, with certain parts omitted for clarity showing a typical engagement between the cable structure of this invention and a conventional cleated traction drive.

The individual blocks 11 are rigid and durable and designed to mesh with the vertically disposed cleats 68 of a coil tubing injector, as depicted in FIG. 6, a drive sprocket or coacting pair of drive sprockets (not shown) but described hereinabove, or similar mesh-type drive means. As is typical of these types of drive means, their teeth or cleats can be adjusted laterally to engage and vertically align a tubular member therebetween.

The blocks 11 may be composed of a rigid metal, such as steel, or of a rigid, durable plastic material which will resist high temperatures, maintain high mechanical strength and resist the chemicals which may be encountered in a particular well environment.

Between the first and second tensile lines 12 and 13 and extending parallel thereto inside the blocks 11, FIGS. 1 and 2, is a protected power line 16 comprised, for example, of a composite of insulated electrical conductors and/or fluid conductor tubes for the deployed equipment; three symmetrically arranged individually insulated electrical conductors being shown and designated by the numerals 19, and three symmetrically arranged hollow, fluid conductor tubes being shown and designated by the numerals 20. The conductors 19 and/or 20 may be parallel or helically twisted together to form an electrical and/or hydraulic power line or conduit 16 within the cable structure. The protected line 16 is located centrally of the blocks 11 in an axial bore 31, FIG. 2, and is laterally isolated from the tensile lines 12 and 13 and Protected against compressive forces by the intervening rigid body structure of the blocks 11.

Figure 3:
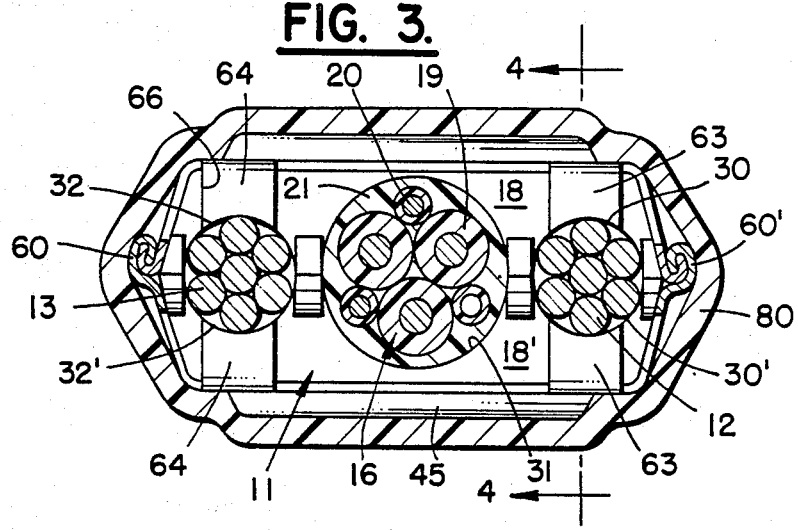
FIG. 3 is a end sectional view of an embodiment of a jacketed cable structure in accordance with this invention.

An elastomeric filler 21, FIGS. 2 and 3, is applied to the line 16 to fill any voids between the individual conductors and the blocks 11. Preferably, the filler 21 selected of a material which can flow into the air voids in the blocks 11 during assembly. The filler expands and hardens in the voids when vulcanized to effect a mechanical interlock between the lines 12, 13 and 16 and the blocks 11. This interlock minimizes any relative slippage between the lines 12, 13 and 16 and the blocks 11 and blocks gas and chemical flowage between these lines and the vertebrae during usage of the cable structure. The cable structure may be vulcanized while on its reel.

Filler materials suitable for this purpose may be any of the ethylene-propylene diene monomer (EPDM) blends having a Mooney viscosity measured at 212° F. of between 50 and 130.

As illustrated in FIGS. 2 and 3 each block 11 is comprised of a pair of opposing upper and lower jaws 18 and 18', respectively which are substantially identical in size and shape and therefore interchangeably usable in the cable structure 10. The jaws pairs 18, 18', FIGS. 3 include two pairs of open-sided grooves 30, 30'and 32, 32', respectively, which are typically of identical size and shape and form therebetween a juxtaposed pair of longitudinal gripping surfaces when the jaws are assembled together face-to-face, as shown. Each pair of nearly abutting grooves pairs 30, 30' and 32, 32' has a longitudinal dimension parallel to the Z axis and a transverse radius in the X - Y plane; the X, Y and Z axes being mutually orthogonal, as illustrated in FIG. 1. The orthogonal axes intersect at the central axis or midpoint of the structure 10.

The longitudinal axes of the tensile lines 12 and 13 are centered with respect to the concave walls defining their enclosing groove pairs 30, 30'; 32, 32'. The wall of each such groove is typically semi-circular and circumscribes an arc of about 165 degrees. The radius of each groove wall is slightly greater than the radius of the line 12 or 13 enclosed by that surface. The centers of the oppositely facing groove pairs and their respective enclosed hauling lines 12 and 13 lie on a common axis parallel to the Y axis and are also symmetrically located on each side of the X axis, as best seen in FIG. 2, so that substantially equal compressive forces are applied to each tensile line 12 and 13 by the blocks 11.

The two tensile lines 12 and 13 are twisted in opposite directions to nullify torque in the cable structure 10, and when enclosed and clamped by the blocks 11, are constrained against buckling and against outward radial separation (birdcaging) of the individual rope strands. The adjacent blocks 11 convert the tensile lines 12 and 13 into pairs of contiguous, axially rigid columns capable of exerting substantially equal and symmetrical pushing forces in the Z direction and hence on the downstream length of the cable structure 10 and on any equipment attached to that cable end. The lines 12 and 13 are flexible enough to be bendable in directions parallel to the X axis at the segments between adjacent blocks 11.

The jaw pairs 18, 18' are constructed with acutely angled front and rear surface 24 and 25, FIG. 2, respectively, to permit unrestricted long-radius articulation between successive blocks 11 about the Y axis. To maintain longitudinal alignment between successive blocks 11 and to increase the integrity of the vertebrae, the front surface 24 of each jaw pair 18, 18' is formed with longitudinally projecting pairs of adjoining male tongues 40, 40', respectively, which mate with corresponding pairs of adjoining female grooves 42, 42' formed in the rear surface 25 of each adjoining jaw pair 18, 18' respectively. With the jaw pairs 18, 18', in substantially abutting relationship, FIG. 2, each adjoining pair of grooves 42, 42' completes a substantially semicircular socket and each adjoining pair of tongues 40, 40' completes a substantially rounded-edged pin which is sized to rotate in its opposite socket to provide a journal connection between contiguous blocks 11 during long-radius bending.

As will be evident to those in the art, other types of connections may be employed for journaling the contiguous individual blocks 11 for articulation with the tensile lines 12 and 13 about the Y axis and parallel to the X axis. For some applications, the aforedescribed journal connections between successive blocks 11 may be dispensed with and the blocks 11 longitudinally interconnected in tandem solely by spaced apart attachment to the tensile lines 12 and 13.

The thickness of each jaw; that is, the dimension parallel to the X axis, is such that the groove pairs 30, 30' and 32, 32' clamp peripheral segments of the lines 12 and 13, respectively, with the desired compressive force before the opposing flat surface portions of the jaws abut one another and prevent additional compression of the tensile lines. Thus, the groove pairs 30, 30' and 32, 32' coact to engage therebetween a major portion of the peripheral surfaces of the lines 12 and 13, respectively, and when further compressed, the virtually unextendable blocks 11 firmly clamp such segments thereby minimizing elongation in the Z direction of the clamped tensile lines. The jaws are also symmetrical about the X axis so that the wire strands forming each tensile line 12 and 13 are compressed radially inwardly, substantially equally, to uniformly distribute the compressive gripping forces throughout the entire cross-section of these lines. The outer edge surfaces of the blocks 11 may also be inclined toward their outer surfaces, as illustrated, to minimize the width dimensions of the vertebrae.

The central longitudinal bore 31 formed by the jaws 18 and 18' is practically circular in cross-section with a diameter slightly greater than that of the power line 16 so that when the flat opposing surfaces of the jaw pairs 18, 18' are forced together to the desired extent; that is, to a position where they virtually abut one another, the power line 16 is lightly gripped by the blocks 11. Thus, the power line is constrained longitudinally by the blocks 11 and the filler 21, but is not compressed to an extent which might cause disruption or injury to this line.

As mentioned hereinabove, rather than relying upon the coefficient of friction and the magnitude of the normal compressive forces as the determinative factors in providing the required magnitude of axial driving forces, the instant invention also provides for a positive meshing interaction between the outer vertebrae surfaces and the teeth of an appropriate mesh-type drive.

Figure 4:
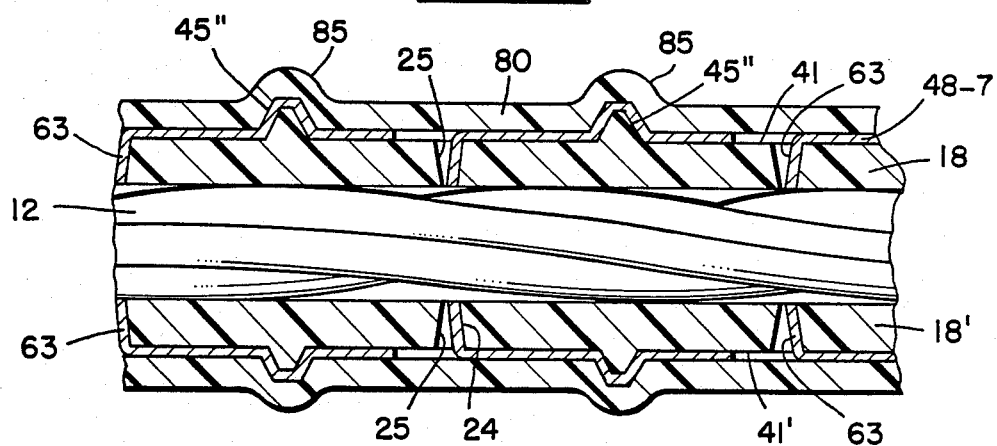
FIG. 4 is a longitudinal cross-sectional view of the jacketed cable structure illustrated in FIG. 3, the view being taken along section lines 4—4 in FIG. 3.

The two major flat surfaces 41 and 41' respectively of each block 11, FIG. 4, is provided with one or more teeth 45 that are spaced apart along the longitudinal axis (Z direction) to mesh between, for example, the cleats 68 of a typical injector, FIG. 6. The teeth 45 may be formed integral with the blocks 11 and are elongate in the Y axis to distribute forces applied thereto over substantially the entire transverse width of each block.

One embodiment of this invention depicted by FIG. 2, finds application in shallow well environments where high magnitude traction forces are not required to suspend or drive the cable vertically. For such applications support channels 48-2 described hereinafter may be omitted and the jaws 18, 18' of each block 11 may simply be held together and fixed to the tensile lines 12 and 13 by two or more rivets or bolts (not shown) which are made long enough to extend parallel to the X axis through similarly disposed bores (also not shown) passing through facing jaw pairs 18, 18'; the bores being located between the tensile lines 12 and 13 respectively, and the power line 16 so as not to interfere with either line. The rivets or bolts inserted into such bores clamp the jaws 18, 18' together upon the tensile lines 12 and 13 while the jaw pairs are held pressed against the lines 12 and 13 to the required extent. The elongation or extendability of the tensile lines 12 and 13 in the Z direction is thus virtually limited to those relatively short lengths of tensile lines 12 and 13 spanning the adjoining blocks 11 and hence, not contained by the blocks, which lengths provide the points of articulation in the X direction for vertebrae bending movements. Accordingly, any relative displacements in the Z direction between contiguous blocks 11 is minimized, with the result that the longitudinal pitch (or distance between the crests of the teeth 45 in the Z direction) is maintained virtually constant.

If greater axial strength is desired, the blocks 11 may also be covered by additional pairs of support channels 48-2, as shown in FIG. 2.

In this embodiment the teeth 45 of cable structure also referred to by the numeral 10 the oppositely facing support channels 48-2. Each channel 48-2 is typically latticed from a narrow, thin sheet of rigid material, such as steel, which may be provided with the hereinafter described shapes and openings by standard metal stamping and bending operations. The resulting lattice structure reduces the weight of the channel pairs 48-2 and thereby increases the strength-to-weight ratio of the cable structure 10.

Each channel 48-2 is typically comprised of a series of essentially identical lattice sections joined end-to-end by opposite pairs of elongated strips 65; one of the strips 65 of the channel 48-2 being visible in FIG. 2. The strips 65 are formed as an integral part of each channel 48-2 and are of relatively narrow and thin cross-section to permit long radius bending between adjacent channel sections in the X direction but are rigid in the longitudinal direction (Z) and therefore are virtually nonextendable in that direction. Alternatively, pivotal connections (not shown) may be used to link the adjoining channel sections together in a tandem, mutually bendable, but essentially axially nonextendable, relationship.

Each channel 48-2, FIGS. 1 and 2, includes a flat base section 50 from which parallel leg sections 51 and 52 depend at an obtuse angle of almost 120 degrees from the plane of the sections 50 and extend in the same direction thus providing each channel with a trough-like shape which conforms closely to the shape and dimensions of its underlying jaw pairs 18 and 18', respectively. Each leg section 51 and 52 has a pair of flat rectangular edges 60 which abut in the Y plane when the channel pairs are mounted on the blocks 11. When thusly positioned, the edges are sufficiently close to be clamped together and attached by, for example rivets or bolts (not shown) or by bending and folding the overlapping edges together, as shown in FIGS. 1 and 3.

The attachment of the channels 48-2 to one another is normally performed while the jaws 18, 18' are held compressed to the desired extent on the lines 12 and 13 and once attached together, the channels are sufficiently rigid to prevent any subsequent significant separation between the clamped jaws. The base sections 50 are stamped out as indicated by numerals 55 in FIG. 2 to provide a series of equally spaced, elongate openings 55 for receiving the teeth 45. The teeth 45 have a great enough height to project far enough above the surfaces of the channel base sections 50 on each side of the teeth, FIG. 1, to make required meshing engagements with the available mesh drive. The teeth may engage the edges of the openings 55 through which they project with an interference fit to restrain the channels from moving axially on their jaw pairs.

Figure 5:
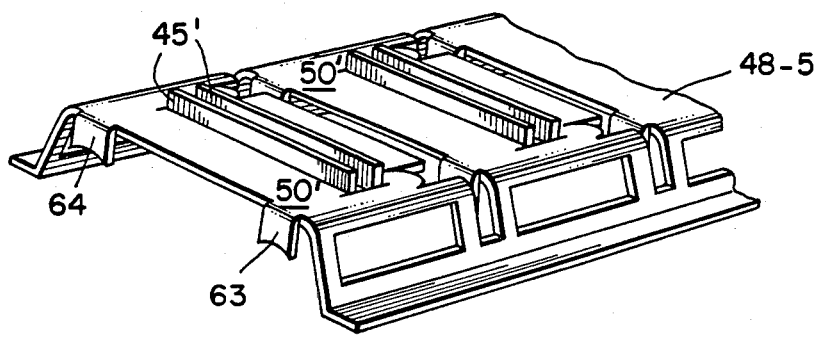
FIG. 5 is a perspective view of another embodiment of a channel member for use in the instant cable structure.

With reference to FIGS. 1 and 5, extending inwardly from, and at right angles to each base section of each channel pair are a pair of tabs 63, 64, respectively. The tabs are disposed symmetrically on each side of the Z axis and have their ends concave in the X-Y plane with a radius of curvature substantially equal to the radius of curvature of the underlying tensile line 12 or 13. The tabs 63 and 64 extend far enough from the plates 50 to engage their respective underlying tensile lines, FIG. 4. With this arrangement each tab 63, 64 engages substantially one-half of the peripheral surface of its respective underlying tensile element 12 or 13. The tabs 63 and 64 also abut opposite end surfaces 24 and 25 of each jaw 18 and 18', to further prevent relative axial movement between the channels and the blocks 11. The end surfaces 24 and 25, FIGS. 2 and 3, of each jaw may be slotted in the Y direction, as indicated by the numerals 66, to receive therein the tabs 63 and 64 and lock the channels against movement, as well.

Figure 7:
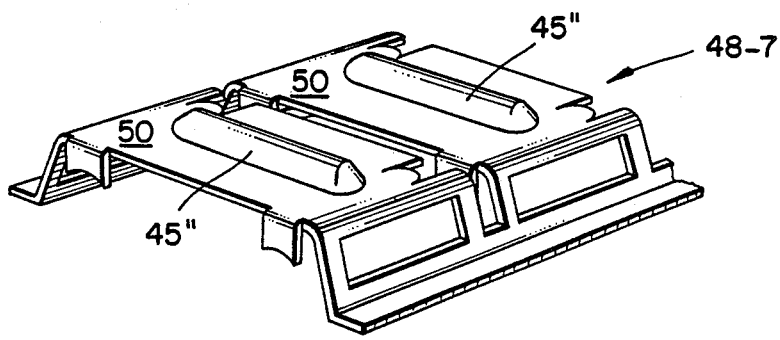
FIG. 7 is a perspective view of the embodiment of one of the channels shown in FIGS. 3 and 4.

By configuring the openings 55 in the base sections 50 of the channels 48-2 so that the opening edges conform to and abut the root portions of the teeth 45, supplementary support is provided to the base of the teeth. As specifically illustrated by the embodiment of FIG. 5, to increase the strength and rigidity of the teeth, the base sections 50' of either or both channels 48-5 may be struck to provide adjacent pairs of rectangular teeth 45' which, if so required, can extend far enough outwardly from the base sections 50' to make direct meshing engagement with the drive means. In such case, the teeth 45 may also serve as locating cores for the teeth 45'. For some applications, the teeth 45 may be omitted entirely leaving the teeth 45' as the sole means to make meshing engagement with the available traction drive. As shown in FIG. 7, the pairs of channels therein designated 48-7 may be extruded, stamped out or otherwise formed to provided teeth 45'' which are continuous, integral parts of the base sections 50 and conform in size and shape to their underlying teeth in the jaws 18, 18'. Alternatively, the teeth 45 on the jaws 18, 18' may be eliminated and reliance placed soley on the teeth 45'' on the channels 48-7 to provide the desired meshing engagement between the traction drive and the vertebrae.

For deep well applications and/or where the cable structure is required to withstand extremely adverse conditions of chemical attack, abrasion or impact, a jacket 80, FIGS. 4 and 6 may be applied over the teeth 45, 45' or 45'' to form the embodiments of the cable structure illustrated in FIGS. 3 and 6 respectively. The jacket 80 may be applied so that it spans the flat area between the teeth and is subsequently compressed and deformed under heat and pressure; the latter being supplied by conventional coacting forming rollers (not shown) having outwardly exterior metal forming surfaces shaped and sized to the shape and size of the cleats or sprocket teeth which ultimately will be employed to suspend and drive the cable structure.

The teeth 45, 45' or 45'', as the case may be, are configured and sized to serve as one half of the forming dies which define the shape and the longitudinal spacing between the exterior teeth 85 formed in the jacket 80 by the aforedescribed process. The jacket 80 may be composed of a flexible polymeric, such as nylon, or other suitable material. For maximum strength and protection, an armor jacket may be applied to the vertebrae structure by winding overlapping helical layers of a tape of Z cross-sectional shape and composed of a suitable ductile material, such as a ductile iron alloy, onto the blocks 11 and teeth 45, FIG. 2. The armor layer may be used in lieu of the channels 48-2 or if greater structural strength is desired, the channels may be used and the armor windings may be wound about any of the channels 48-2 (FIG. 1), 48-5 (FIG. 4), or 48-7 (FIG. 5). The armor windings may be applied tightly to the compressed underlying blocks 11 and channels and thus serves to clamp the former tightly onto the tensile lines.

Once given the above disclosure, many other embodiments, modifications and improvements will become apparent to those skilled in the art. Such other embodiments, improvements and modifications are considered to be within the scope of this invention as defined by the following claims.

What is claimed is:

1. An elongated cable structure having a longitudinal axis and comprising:
    at least one elongated tensile element having its longitudinal axis extending substantially parallel to said longitudinal axis of said cable structure for suspending the cable substantially longitudinally and being bendable about said longitudinally axis of the cable structure;
    an elongated articulated vertebrae comprised of a plurality of axially adjacent jaws of rigid cross-section affixed to said tensile element;
    said vertebrae having substantially flat opposite exterior surfaces;
    a plurality of longitudinally spaced-apart teeth extending from at least one of said flat surfaces of said vertebrae for driving the cable structure longitudinally;
    said teeth arranged in substantially constant, spaced-apart longitudinal relationship; and
    substantially nonextendable means, mounted over and connecting said jaws, for maintaining said teeth in said spaced-apart relationship.

2. The cable structure according to claim 1, wherein said teeth extend from both said opposite surfaces of said vertebrae.

3. The cable structure according to claim 1, and further comprising a jacket enclosing said vertebrae, and wherein said teeth are formed in said jacket.

4. The cable structure according to claim 3 herein said jacket is an armor jacket.

5. The cable structure according to claim 1 wherein said means includes at least one elongated channel mounted on one of said jaws, said channel having a longitudinal axis parallel to said longitudinal axis of cable structure.

6. The cable structure according to claim 5 wherein said channel is bendable about said longitudinal axis and spans a plurality of adjacent jaws.

7. The cable structure according to claim 5, wherein there are a pair of elongated channels mounted in opposite facing relationship on said one jaw, whereby said one jaw is enclosed by the channels.

8. The cable structure according to claim 7, wherein said at least one tensile element comprises,
    a pair of alterally spaced-apart tensile lines having longitudinal axes substantially parallel to each other and to said longitudinal axis of said able, and wherein said channels have tabs depending therefrom and extending interiourly of said vertebrae for engaging different ones of said tensile lines.

9. The cable structure according to claim 1, wherein said teeth are formed integral with said means.

10. The cable structure according to claim 1, wherein said teeth are affixed on said means.

11. The cable structure according to claim 5, wherein each of said flat surfaces of said vertebrae mounts a channel member thereon which spans opposite surfaces of adjacent jaws.

12. The cable structure according to claim 11, wherein said channels have openings therein through which said teeth extend.

13. The cable structure according to claim 11, wherein said channels and said teeth are affixed to one another.

14. An elongated cable structure having a longitudinal axis and comprising:
    at least one elongated tensile element having its longitudinal axis extending substantially parallel to said longitudinal axis of said cable structure for suspending the cable substantially longitudinally and being bendable about said longitudinal axis of the cable structure;
    an elongated articulated vertebrae comprised of a plurality of axially adjacent jaws of rigid cross-section affixed to said tensile element;
    said vertebrae having substantially flat opposite exterior surfaces;
    a plurality of longitudinally spaced-apart teeth extending from at least one of said flat surfaces of said vertebrae for driving the cable structure longitudinally;
    said teeth arranged in substantially constant, spaced-apart longitudinal relationship;
    substantially nonextendable means for maintaining said teeth in said spaced-apart relationship; and
    a jacket enclosing said vertebrae, said teeth being formed in said jacket.

15. The cable structure according to claim 14 herein said jacket is an armor jacket.

16. An elongated cable structure having a longitudinal axis and comprising:
    at least one elongated tensile element having its longitudinal axis extending substantially parallel to said longitudinal axis of said cable structure for suspending the cable substantially longitudinally and being bendable about said longitudinally axis of the cable structure;
    an elongated articulated vertebrae comprised of a plurality of axially adjacent jaws of rigid cross-section affixed to said tensile element;
    said vertebrae having substantially flat opposite exterior surfaces;
    a plurality of longitudinally spaced-apart teeth extending from at least one of said flat surfaces of said vertebrae for driving the cable structure longitudinally;
    said teeth arranged in substantially constant, spaced-apart longitudinally relationship; and
    substantially nonextendable means for maintaining said teeth in said spaced-apart relationship, said means including at least one elongated channel mounted on one of said jaws, said channel having a longitudinal axis parallel to said longitudinal axis of the cable structure.

17. The cable structure according to claim 16 wherein said channel is bendable about said longitudinal axis and spans a plurality of adjacent jaws.

18. The cable structure according to claim 16, wherein there are a pair of elongated channels mounted in opposite facing relationship on said one jaw, whereby said one jaw is enclosed by the channels.

19. The cable structure according to claim 18, wherein said at least one tensile element comprises, a pair of laterally spaced-apart tensile lines having longitudinal axes substantially parallel to each other and to said longitudinal axis of said cable, and wherein said channels have tabs depending therefrom and extending interiorly of said vertebrae for engaging different ones of said tensile lines.

20. The cable structure according to claim 16 wherein said teeth are formed integral with said means.

21. The cable structure according to claim 16, wherein each of said flat surfaces of said vertebrae mounts a channel member thereon which spans opposite surfaces of adjacent jaws.

22. The cable structure according to claim 21, wherein said channels have openings therein through which said teeth extend.

23. The cable structure according to claim 21, wherein said channels and said teeth are affixed to one another.

* * * * *